June 9, 1959
W. C. RIESTER
2,889,569
WINDSHIELD WIPER SYSTEM
Filed Nov. 28, 1956
2 Sheets-Sheet 1
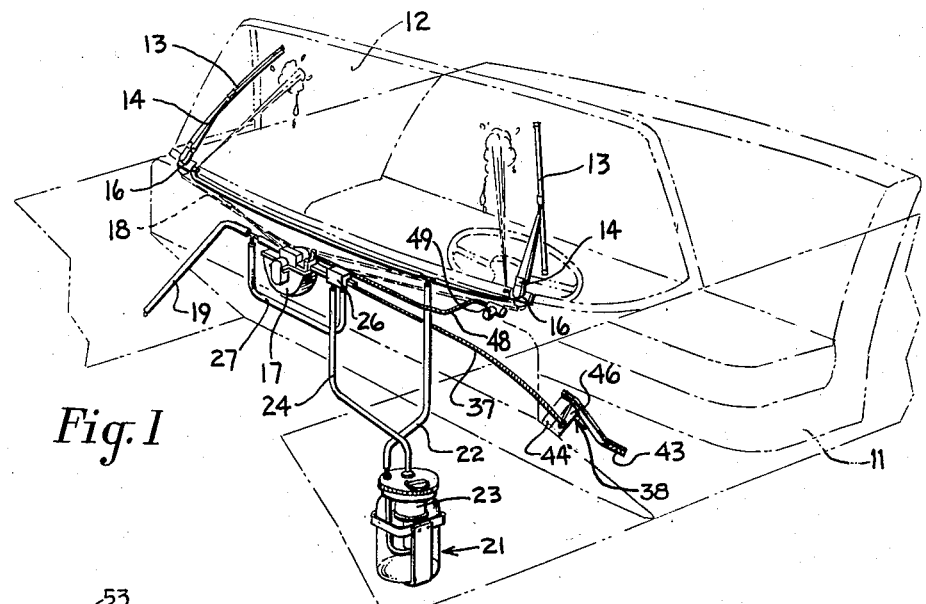
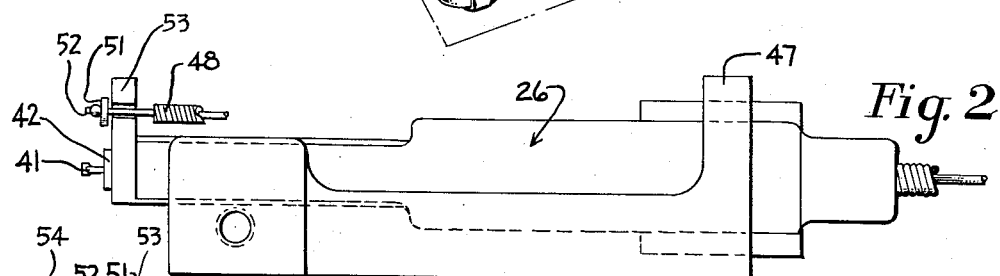
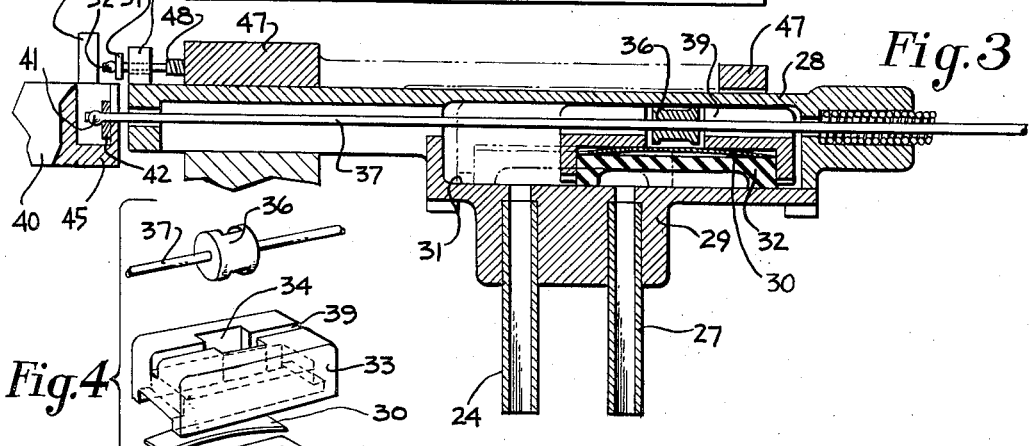
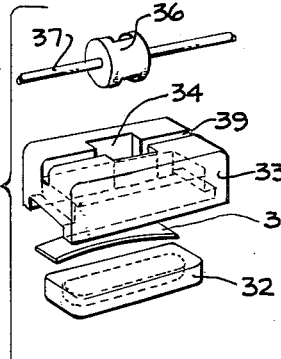
INVENTOR.
WILLIAM C. RIESTER
BY
Bean Brooks Buckley & Bean
ATTORNEYS June 9, 1959  W. C. RIESTER  2,889,569
WINDSHIELD WIPER SYSTEM
Filed Nov. 28, 1956  2 Sheets-Sheet 2

INVENTOR.
WILLIAM C. RIESTER
BY
Bean Brooks Buckley & Bean.
ATTORNEYS

United States Patent Office 2,889,569
Patented June 9, 1959

2,889,569

WINDSHIELD WIPER SYSTEM

William C. Riester, Buffalo, N.Y., assignor to Trico Products Corporation, Buffalo, N.Y.

Application November 28, 1956, Serial No. 624,767

10 Claims. (Cl. 15—250.4)

This invention relates to a windshield wiper system, and more particularly to a coordinated washer and wiper system having a foot control means for initiating a washer-wiping cycle.

The use of windshield washers in motor vehicles is becoming common practice, and many types of washer arrangements have been proposed and applied. Such systems range all the way from a simple pump operated spraying system requiring a separate wiper motor control, to power-operated spraying systems with coordinated wiper motor action. In the latter type of arrangement, a control button is adapted for initiating a complete washer and wiping operation, said control button being positioned for convenient manual use by the vehicle operator, such for example, as is disclosed in Patent 2,743,473, issued May 1, 1956. In the system disclosed in said patent, the vehicle operator must temporarily remove one of his hands from the steering wheel to operate the control. Such action, while not ordinarily detrimental to the safe operation of the vehicle, may prove hazardous if the operator has to disrupt his vision from the road to locate the control, as in the case where the vehicle operator is not entirely familiar with the location thereof.

The present invention provides an improvement over the manually operable type of washer-wiper system insofar as the control is arranged for foot operation thus eliminating the necessity for removal of either hand from the steering wheel, and not requiring disruption of the operator's vision from the road. While foot-operated controls for washer-wiping systems are known, the present invention represents an improvement with respect to simplicity of structure and arrangement, and adaptability for use with certain washer and wiper motor assemblies. In short, the present invention provides an improved foot-operated control for washer-wiper systems which may be readily applied to vehicles having known washer and wiping motor units.

The main object of this invention is to provide an improved washer-wiper control for use on motor vehicles.

A further object of this invention is to provide an improved washer-wiper system for motor vehicles having a foot-operated control mechanism.

Another object of this invention is to provide a foot-operated control for a vehicle washer-wiper system which control is extremely simple in structure and which is readily adaptable to well-known types of washer-wiper motor assemblies.

These and further objects and features of the invention will become more apparent from the following description and the accompanying drawings wherein:

Fig. 1 is a fragmentary perspective view of a motor vehicle having a washer-wiper arrangement including a foot control mechanism of the invention;

Fig. 2 is an enlarged plan view showing a portion of a valve used in the arrangement illustrated in Fig. 1;

Fig. 3 is a section view of the valve shown in Fig. 2;

Fig. 4 is an exploded perspective view of certain elements used in the valve of Fig. 2;

Figure 5:
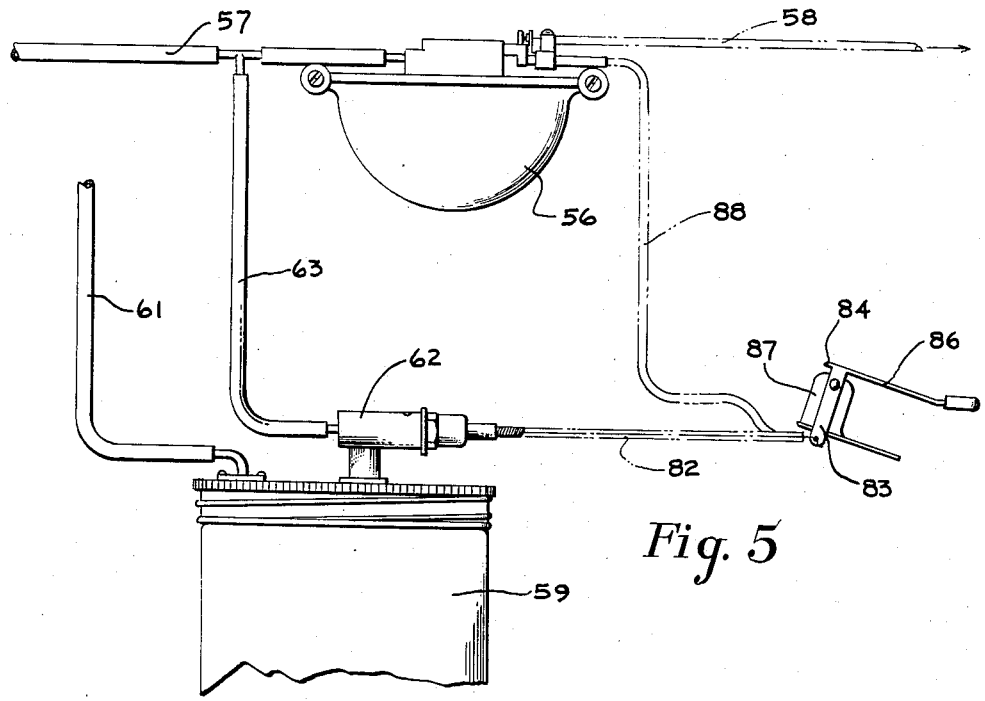
Fig. 5 is a schematic illustration showing a modified form of a washer-wiper arrangement embodying the principles of the invention.

Referring now to the drawings, numeral 11 identifies a motor vehicle having a windshield 12 of the wrap-around type, on which are operatively mounted a pair of wiper blade asemblies 13 supported by wiper arms 14 mounted upon reciprocable rockshafts 16 which are operatively connected to a wiper motor 17 by means of a flexible transmission such as cables 18, all in the usual manner. The wiper motor may be of the vacuum-operated type connected to a vacuum source, such as the engine manifold (not shown) by means of a hose or conduit 19. A reservoir assembly 21, arranged in a convenient location in the engine compartment, has a hose or conduit 22 which is bifurcated for delivery of a given quantity of cleaning liquid upon the windshield for wetting of the areas traversed by the wiper blades. The reservoir assembly includes a pump unit 23, which is vacuum-operable to cause ejection of the cleaning fluid onto the windshield via the hose 22, such a reservoir pump which may be of the type disclosed in Patent 2,649,332, issued August 18, 1953.

Means for connecting the pump unit 23 with the vacuum source includes a hose or conduit 24 secured to a slide valve assembly 26 which joins with the vacuum hose 19 via a hose or conduit 27.

The slide valve assembly 26 includes a top housing 28 to which is affixed a bottom housing 29, said housing portions being formed to provide a slide valve chamber 31, as best seen in Fig. 3. Slidably arranged within the chamber 31 is a slide valve 32 adapted in operative position to bridge the open ends of the hoses 24 and 27 and arranged in non-operative position to disrupt said bridgement. The slide valve 32 is positioned within a valve cap 33 arranged for reciprocating sliding movement within the chamber 31 which valve cap has a recess 34 for reception of a lug reception of a lug 36 affixed to a control cable 37 forming part of a Bowden wire which connects the slide valve assembly 26 to a foot-operated control 38. A leaf spring 30 is arranged between the top of the slide valve 32 and the valve cap 33 to provide seating pressure to the slide valve. A groove 39 is formed in the cap 33 to accommodate the cable 37, the latter of which is provided with a lug 41 at its extremity arranged to abut a washer 42 within an end portion 45 of the wiper motor slide valve 40.

The foot-operated control 38 includes a pedal 43 pivotally secured to a bracket 44 which is fastened to the floor board of the vehicle in a manner whereby the pedal may be conveniently manipulated by the left foot of the vehicle operator. The cable 37 is connected to an arm 46 affixed to the pedal 43 in such a manner that movement of the pedal will result in longitudinal movement of the cable 37 so that the slide valve 32 will be shifted to operative position. A torsion spring (not shown) is arranged to rotate the pedal and cause longitudinal movement of the cable to shift the slide valve to non-operative position when the operator's foot is removed from the pedal. A bracket 47, which is secured to the wiper motor is arranged to allow the slide valve assembly to move longitudinally relative to the wiper motor.

A wiper motor control cable 48, one end of which is connected to a control knob 49 positioned for convenient manipulation by the vehicle operator, has at the other end a washer 51 arranged between a lug 52 on the cable and an arm 53 formed integral with the top housing 28. The end of the cable 48 beyond lug 52 is arranged to abut a finger portion 54 formed integral with the wiper motor slide valve 40.

It will be seen that the slide valve assembly 26 will be caused to move longitudinally with the motor slide valve 40 as the control knob 49 is rotated and that the motor slide valve will be moved away from the assembly 26 when the cable 37 is moved in response to pivotal movement of the pedal 43. More particularly, it can be seen that when the cable 37 is moved longitudinally, the slide valve 40 will be shifted to cause wiper motor operation, while simultaneously the slide valve 32 will be moved and bridge the ends of the hoses 24 and 27. Thus by simple foot pressure upon the pedal 43, the slide valve 40 of the wiper motor will be shifted to cause motor operation, and at the same time the reservoir pump will be connected to a vacuum source to initiate spraying of cleaning fluid upon the windshield. In operation, the vehicle operator will maintain pressure upon the pedal 43 until the end of the fluid spraying operation and will continue to maintain holding pressure until the wiper blades have wiped dry the washed areas of the windshield. Removal of the operator's foot from the pedal will terminate wiper motor operation, unless the wiper motor had been operating prior to initiation of said washer-wiping cycle, in which event the wiper motor will continue operating as it was prior to the washer-wiping operation.

Figure 6:
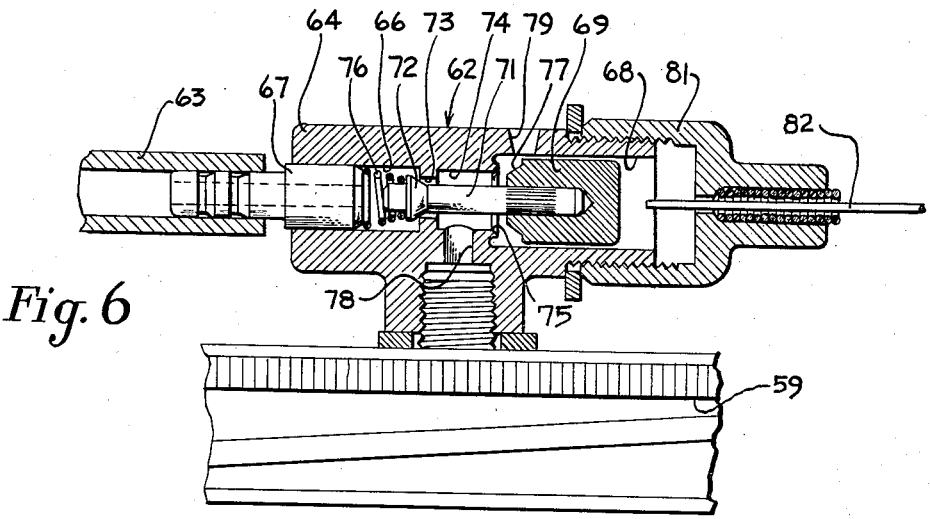
Fig. 6 is an enlarged sectional view of a valve used in the arrangement illustrated in Fig. 5.

Referring to Figs. 5 and 6, another embodiment of the invention is illustrated which attains the stated objectives in a somewhat different manner.

The illustrated arrangement includes a wiper motor 56 connected to a source of vacuum by a hose or conduit 57, and having a motor control cable 58, one end of which is affixed to the slide valve of the motor, the other end of which is affixed to a control knob (not shown) located for convenient manipulation by the vehicle operator, and a reservoir assembly 59 having a pump unit (not shown) similar in structure and operation to the pump unit 23 in the embodiment above described. A hose or conduit 61 is arranged to conduct windshield cleaning fluid from the reservoir assembly to spray nozzles (not shown) arranged for spraying said fluid in designated areas upon the vehicle windshield.

Mounted upon the reservoir is a valve 62 which is adapted for connection of the reservoir pump unit with the source of vacuum via hose or conduit 63. The valve 62 includes a housing 64 having a bore 66 for reception of a nipple 67, and a bore 68 axially displaced from the bore 66, said bore 68 slidably supporting a valve head 69. Affixed to the valve head 69 is a valve stem 71 which has a tapered valve surface 72 positioned within the bore 66, and which is arranged for seating upon valve seat 73 separating the bore 66 from a bore 74 the latter of which is located between the bores 66 and 68. A compression spring 76 is arranged between the end of the nipple 67 and the valve head 72 whereby the valve head 72 is normally maintained seated in the valve seat 73. The valve head 69 has a tapered end portion 77 arranged for engagement with a seat 75 when the valve head 69 is moved axially toward the left end of the bore 68. The bore 74 is connected to the pump unit via a passageway 78, while the bore 68 is vented to atmosphere by means of vent 79. End piece 81 threadably secured to the end of the housing 64, encloses the end of the bore 68 and positionally supports one end of a control cable 82 in the form of a Bowden wire, the other end of the cable being attached to an arm 83 of a foot operated control 84.

The foot operated control 84 includes a pedal 86 to which the arm 83 is attached, and a bracket 87 pivotally supporting the pedal and arranged for securing the foot operated control in a convenient location for use by the vehicle operator. A control cable 88 extends between the foot operated control 84 and the wiper motor slide valve 40 and is adapted so that downward movement of the pedal 86 will cause shifting of the wiper motor slide valve to provide wiper motor operation. A torsion spring (not shown) is included in the foot operated control to urge the pedal in a counter-clockwise direction when the pedal is not being used.

It will be seen that when the vehicle operator depresses the pedal 86 to cause clockwise rotation about its pivot, the control cables 82 and 88 will be moved in the direction of the valve 62 and wiper motor slide valve respectively. Such movement will cause the end of cable 82 to engage the valve head 69 moving the latter until the tapered portion 77 engages the seat 75, said movement also causing unseating of the valve head 72 to thus establish vacuum connection between the reservoir pump unit and the vacuum source via hoses 63 and 57. As a result thereof, the pump unit will operate to deliver a given quantity of cleaning fluid to the windshield, and simultaneously the wiper motor will be operated to cause wiping action of the wiper blades. Upon release of foot pressure upon the foot pedal 86, the latter will return to non-operative position under the urge of the torsion spring and the valve head 72 will be seated under the urging of spring 76 to cut off vacuum connection between the pump unit and the vacuum source. It will be seen that wiper motor operation will continue as long as the pedal 86 is depressed, even though fluid ejection has terminated. To obtain a second ejection of cleaning fluid upon the windshield, all that is necessary is that the operator release pedal 86 and depress it again, whereupon the system will operate to automatically cause a washing and wiping of the windshield in the manner as above described. It may be mentioned that the connection of the control cable 88 to the wiper motor slide valve is made in the manner of the first described embodiment, so that in the event the wiper motor had been operating under the control of cable 58 when the washer-wiping cycle is initiated, wiper motor operation will be automatically resumed after the operator releases the pedal 86.

It will be apparent that either of the two embodiments will meet the stated objectives in a simple and effective manner.

The foregoing description has been given in detail without thought of limitation since the inventive principles involved are capable of assuming other physical embodiments without departing from the spirit of the invention and the scope of the appended claims.

What is claimed is:

1. A motor vehicle windshield washer-wiper system including a wiper motor having a control valve operable to provide wiping action to wiper blades mounted for oscillating movement upon a windshield, a reservoir assembly having a pump operable for delivery of a given quantity of cleaning fluid to predesignated areas on the windshield, a valve assembly mounted for movement with said motor control valve relative to said motor and including relatively movable valve means operable to connect the reservoir assembly to a power source for operation of said pump, and a foot operated control adapted for the simultaneous operation of the wiper motor valve and the valve means.

2. A motor vehicle windshield washer-wiper system including a pressure operated wiper motor having a control arranged to provide wiping action to wiper blades mounted for oscillating movement upon a windshield, a reservoir assembly having a pressure operated pump for delivery of a given quantity of cleaning fluid to predesignated areas on the windshield, a valve assembly mounted for movement with the motor control including relatively movable valve means operable to connect the reservoir assembly to a pressure source for operation of said pump, and a foot operated control adapted for the simultaneous connection of the wiper motor and the valve means to the source of pressure fluid.

3. A motor vehicle windshield washer-wiper system including a vacuum operated wiper motor having a control arranged to provide wiping action to wiper blades mounted for oscillating movement upon a windshield, a reservoir assembly having a vacuum operated pump for delivery of a predetermined quantity of cleaning fluid to predesignated areas on the windshield, a valve assembly mounted for movement with the motor control including relatively movable valve means operable to connect the reservoir assembly to a vacuum source for operation of said pump, and a foot operated control adapted for the connection of the wiper motor and the valve means to a vacuum source to cause simultaneous operation of the wiper motor and the pump.

4. A motor vehicle windshield washer-wiper system including a vacuum powered wiper motor adapted to provide wiping action to wiper blades mounted for oscillating movement upon a windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve assembly positioned adjacent the wiper motor for movement relative thereto and having a slide valve movable therein to complete a vacuum circuit through a hose leading from the pump to a vacuum generating source, and a foot operated control adapted for the simultaneous movement of the wiper motor valve and the slide valve to cause operation of the wiper motor and the pump.

5. A motor vehicle windshield washer-wiper system including a vacuum powered wiper motor adapted to provide wiping action to wiper blades mounted for oscillating movement upon a windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve assembly positioned adjacent the wiper motor for movement relative thereto and having a slide valve movable to complete a vacuum circuit in a hose leading from the pump to a vacuum generating source, and a foot operated control having a lever movable about a pivot in one direction for the simultaneous movement of the wiper motor valve and the slide valve to cause operation of the wiper motor and the pump, and movable about the pivot in the opposite direction for the simultaneous movement of the wiper motor valve and the slide valve to discontinue operation of the pump and return the motor to its previous condition of operation.

6. A motor vehicle windshield washer-wiper system including a vacuum powered wiper motor adapted to provide wiping action to wiper blades mounted for oscillating movement upon a windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve assembly positioned adjacent the wiper motor and having a slide valve movable to complete a vacuum circuit in a hose leading from the pump to a vacuum generating source, means to provide manual control of the wiper motor including means for moving said valve assembly with said motor valve relative to said motor, and a foot operated control having a lever connected to said motor valve and said pump slide valve and movable about a pivot in one direction for the simultaneous movement of the wiper motor valve and the pump slide valve to cause operation of the wiper motor and the pump, said lever being movable about the pivot in the opposite direction for the simultaneous movement of the wiper motor valve and the pump slide valve to discontinue operation of the pump and return the wiper motor to its previous condition of operation.

7. A motor vehicle windshield washer-wiper system including a vacuum powered wiper motor adapted to provide wiping action to wiper blades mounted for oscillating movement upon the windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve means positioned adjacent the wiper motor having a first hose connecting the valve means to a vacuum generating source and a second hose connecting the valve means to the pump, said valve means having a slide valve arranged in a non-operative position for bridgement of the open end of said first hose means and movable to an operative position for bridgement of the open ends of the first and second hose means to establish vacuum circuit through the valve means, a cable affixed at one end to the motor valve and at the other end to a control knob positioned for convenient manipulation by the vehicle operator for the manual movement of the wiper motor valve, and a foot operated control having a lever arranged for pivotal movement and being connected by a cable to the slide valve and to the wiper motor valve whereby movement of the lever about the pivot in one direction will cause movement of the wiper motor valve and the slide valve resulting in operation of the wiper motor and the pump, and spring means arranged in the foot operated control adapted upon release of foot pressure from the lever to cause movement of the lever about the pivot in the other direction resulting in discontinuation of wiper motor and pump operation.

8. A motor vehicle windshield washer wiper system including a vacuum powered wiper motor adapted to provide wiping action to wiper blades mounted for oscillating movement upon a windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve assembly mounted atop the reservoir assembly and having a spring loaded valve means adapted in non-operative position for disrupting a vacuum circuit extending between the pump and a vacuum generating source and adapted in operative position for completing a vacuum circuit between the pump and the vacuum generating source, and a foot operated control having a lever movable about a pivot in one direction and arranged for movement of the wiper motor valve and the spring loaded valve to cause operation of the wiper motor and the pump, and movable about the pivot in the opposite direction for the simultaneous movement of the wiper motor valve and the spring loaded valve to discontinue operation of the wiper motor and the pump.

9. A motor vehicle windshield washer-wiper system including a vacuum powered wiper motor adapted to provide wiping action to wiper blades mounted for oscillating movement upon a windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve assembly mounted atop the reservoir assembly and having a spring loaded valve means adapted in non-operative position for disrupting a vacuum circuit extending between the pump and a vacuum generating source and adapted in operative position for completing a vacuum circuit between the pump and the vacuum generating source, means to provide manual control of the wiper motor entirely independently of the pump, and a foot operated control having a lever movable about a pivot in one direction and arranged for movement of the wiper motor valve and the spring loaded valve to cause operation of the wiper motor and the pump, and movable about the pivot in the opposite direction for the simultaneous movement of the wiper motor valve and the spring loaded valve to discontinue operation of the wiper motor and the pump.

10. A motor vehicle windshield washer-wiper system including a vacuum powered wiper motor adapted to provide wiping action to wiper blades mounted for oscillating movement upon the windshield, hose means connecting the wiper motor to a vacuum generating source, said motor having a valve movable to complete the vacuum circuit between the motor and said hose means, a reservoir assembly having a vacuum powered pump for delivery of a predetermined quantity of cleaning fluid to predesignated areas on the windshield, a valve assembly mounted atop the reservoir assembly and having a spring loaded valve means adapted in non-operative position for disrupting a vacuum circuit extending between the pump and a vacuum generating source and adapted in operative position for completing a vacuum circuit between the pump and the vacuum generating source, a cable affixed at one end to the motor valve and at the other end to a control knob positioned for convenient manipulation by the vehicle operator for the manual movement of the wiper motor valve, and a foot operated control having a lever arranged for pivotal movement and being connected by a first cable to the spring loaded valve and by a second cable to the wiper motor valve whereby movement of the lever about the pivot in one direction will cause movement of the wiper motor valve and the spring loaded valve resulting in operation of the wiper motor and the pump, and spring means arranged in the foot operated control adapted upon release of foot pressure from the lever to cause movement of the lever about the pivot in the other direction resulting in discontinuation of wiper motor and pump operation.

References Cited in the file of this patent

UNITED STATES PATENTS

| | | |
|---|---|---|
| 2,649,332 | Rappl | Aug. 18, 1953 |
| 2,724,855 | Olin | Nov. 29, 1955 |
| 2,743,473 | Oishei | May 1, 1956 |
| 2,769,194 | Oishei | Nov. 6, 1956 |